(12) United States Patent
Abehasera

(10) Patent No.: US 10,455,984 B1
(45) Date of Patent: Oct. 29, 2019

(54) CONTAINER

(71) Applicant: TRI Innovations LLC, Hallandale Beach, FL (US)

(72) Inventor: Benyamin Abehasera, Hallandale Beach, FL (US)

(73) Assignee: TRI Innovations LLC, Hallandale Beach, FL (US)

( * ) Notice: Subject to any disclaimer, the term of this patent is extended or adjusted under 35 U.S.C. 154(b) by 0 days.

(21) Appl. No.: 16/285,678

(22) Filed: Feb. 26, 2019

(51) Int. Cl.
| | | |
|---|---|---|
| *A47J 42/00* | (2006.01) | |
| *A47J 42/40* | (2006.01) | |
| *A47J 42/30* | (2006.01) | |
| *A24B 7/00* | (2006.01) | |
| *G01G 23/37* | (2006.01) | |
| *G01G 19/52* | (2006.01) | |
| *B02C 23/16* | (2006.01) | |

(52) U.S. Cl.
CPC ............... *A47J 42/40* (2013.01); *A24B 7/00* (2013.01); *A47J 42/30* (2013.01); *B02C 23/16* (2013.01); *G01G 19/52* (2013.01); *G01G 23/3721* (2013.01); *B02C 2023/165* (2013.01)

(58) Field of Classification Search
CPC .. A47J 42/40; A47J 42/30; A47J 42/26; A47J 42/32; B02C 25/00; B02C 18/08; A24B 7/00; G01G 19/52
USPC ...................................................... 241/169.1
See application file for complete search history.

(56) References Cited

U.S. PATENT DOCUMENTS

| | | | | |
|---|---|---|---|---|
| 5,390,859 | A * | 2/1995 | Rajasekaran | B02C 19/08 241/114 |
| 7,422,170 | B2 * | 9/2008 | Bao | B02C 18/24 241/168 |
| 7,467,754 | B2 * | 12/2008 | McCambridge | A61B 10/0096 241/169.1 |
| 7,942,355 | B2 * | 5/2011 | Yamazaki | B02C 1/025 241/101.2 |
| 7,957,944 | B2 * | 6/2011 | Herbst | B02C 17/1805 241/37 |
| 8,511,596 | B2 * | 8/2013 | Anderson | A01G 25/02 241/101.742 |
| 8,733,679 | B2 * | 5/2014 | Camitta | B02C 18/16 241/169.1 |
| 9,427,020 | B2 * | 8/2016 | Ruzycky | A24C 5/02 |
| 9,681,777 | B1 * | 6/2017 | Dukat | A47J 42/40 |
| 9,730,554 | B2 * | 8/2017 | Chan | A47J 42/34 |
| 9,757,733 | B1 * | 9/2017 | Dukat | B02C 18/08 |
| 10,039,418 | B2 * | 8/2018 | Staiano | A47J 42/34 |
| 10,349,780 | B2 * | 7/2019 | Dukat | A47J 42/14 |

(Continued)

*Primary Examiner* — Faye Francis
(74) *Attorney, Agent, or Firm* — Berger Singerman LLP; Geoffrey Lottenberg

(57) ABSTRACT

A container stores, grinds, and measure material. The container includes upper and lower grinding sections that are mated together and rotated to grind the material. A collection section is below the lower grinding section and includes a mesh screen to filter particulate. The mesh screen also functions as a scale to weigh the contents in the collection section. An electronic housing includes a display, microcontroller, one or more buttons, a communications device, and a power supply. Below the electronics housing is a container section retained by a container holder that also includes a scale. The container is enabled to communicate with an external computing device through an application to send and receive data and commands.

19 Claims, 2 Drawing Sheets

(56) References Cited

U.S. PATENT DOCUMENTS

| | | | |
|---|---|---|---|
| 2007/0158479 A1* | 7/2007 | Westerman | B02C 21/02 241/101.74 |
| 2011/0000992 A1* | 1/2011 | Davis | B02C 21/026 241/101.74 |
| 2014/0261471 A1* | 9/2014 | Ruzycky | A24C 5/02 131/108 |
| 2014/0263780 A1* | 9/2014 | Day, Jr. | A47J 42/38 241/63 |
| 2014/0319249 A1* | 10/2014 | Smith | A47J 43/25 241/24.1 |
| 2015/0298135 A1* | 10/2015 | Spielman | B02C 18/144 241/101.01 |
| 2016/0045841 A1* | 2/2016 | Kaplan | B01J 19/0093 429/49 |
| 2017/0164786 A1* | 6/2017 | Camitta | A47J 42/40 |

\* cited by examiner

CONTAINER

CROSS REFERENCE TO RELATED APPLICATIONS

N/A

FIELD OF THE INVENTION

The present invention relates to the technical field of grinders and containers, more particularly to a computer-connectable container for grinder and storing herbs and other materials.

BACKGROUND OF THE INVENTION

In daily life, people gradually begin to have personalized demands for smoking a small amount of tobacco or refined tobacco, hemp plants, hemp flowers, spices and herbs. Most of these products have to be pulverized or ground in order to effectively smoke. With the increased availability of herbs and other materials suitable for medicinal uses, users are looking for improved ways to store and manage such materials. Accordingly, there is a need in the art for an enhanced-connectivity container for storing, grinding, and managing smoking and other material.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
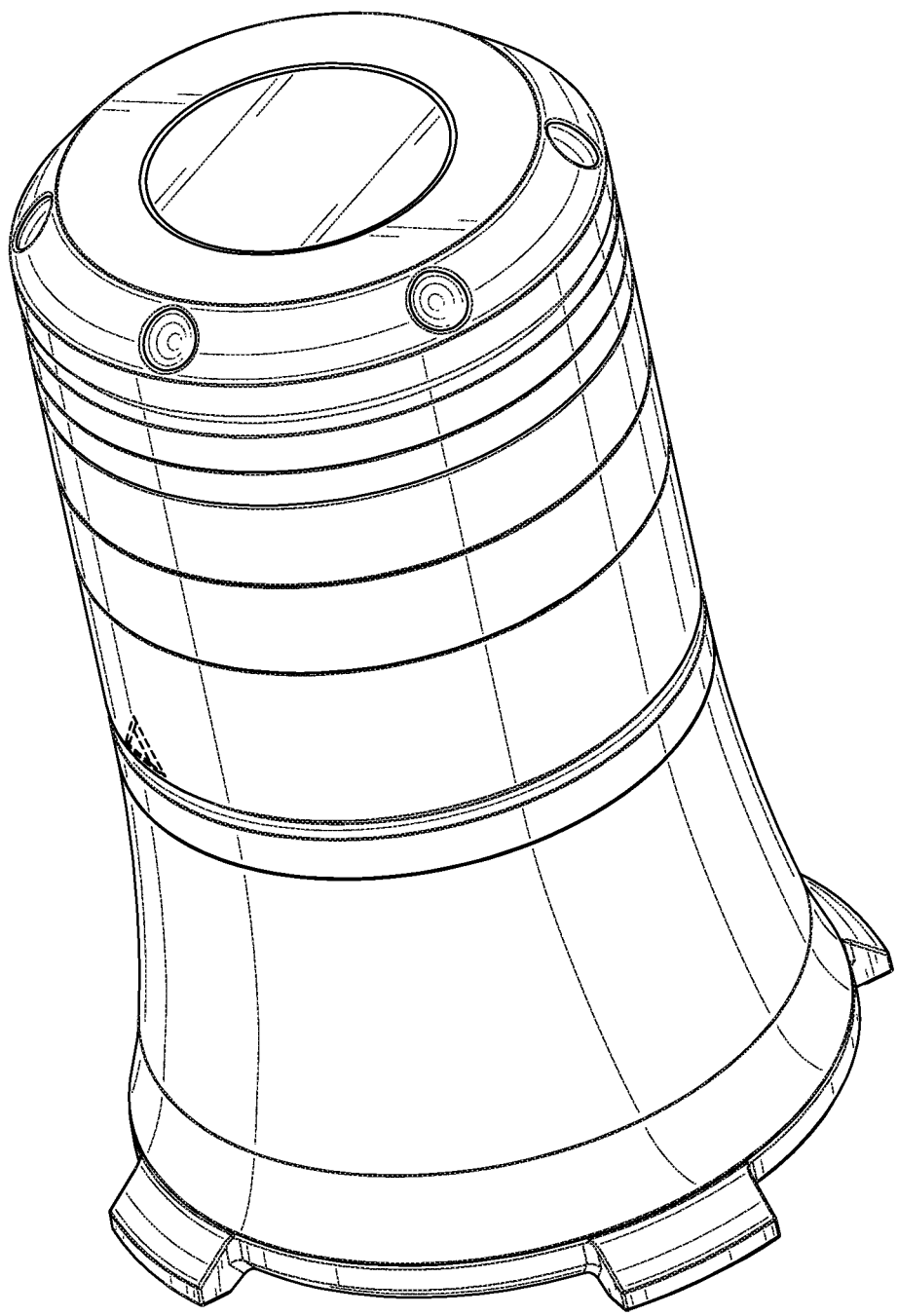
FIG. 1 is a perspective view of the grinder.
Figures 2, 2A, 2B:
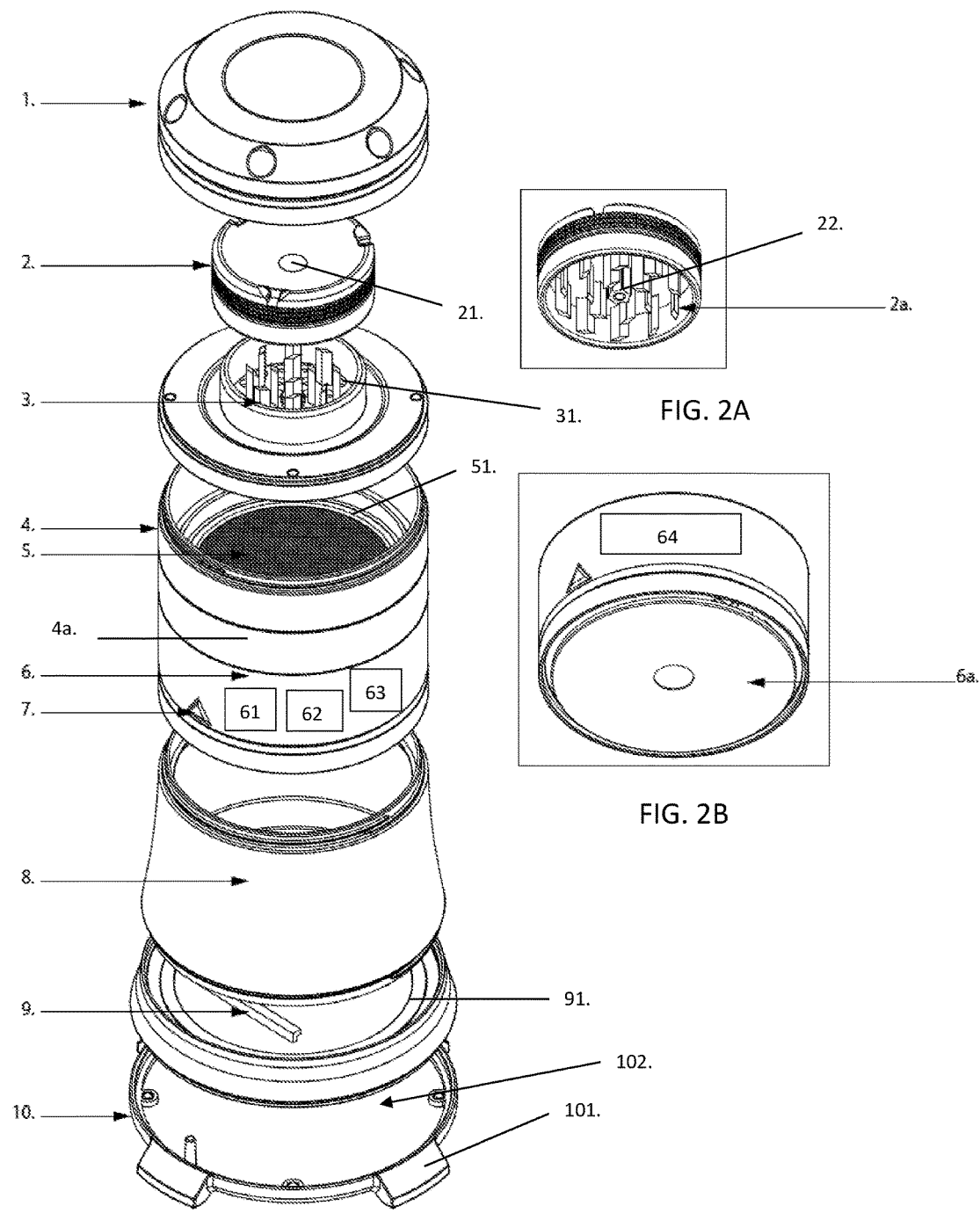
FIG. 2 is exploded view of the grinder.
FIG. 2A is a detail view of the underside of the upper grinding portion.
FIG. 2B is a detail view of the underside of electronics housing.

Referring to FIGS. 1 and 2, the multi-function container of the present invention comprises a series of coaxially aligned components that is configured from top to bottom as follows: a cap 1, an upper grinding section 2, a lower grinding section 3, a collection section 4 having a screen 5, an electronics housing 6 having at least one button 7, a storage container section 8, a container holder 9, and a base 10. In some embodiments, all or a portion of these components are removably attached to one another by snap fit, threads, magnetic connection, or the like for ease of use, cleaning, and replacement of parts.

The cap 1 functions to close the top of the container and also provide a grasping point to turn the upper grinding section 2 with respect to the lower grinding section 3. Accordingly in some embodiments the cap 1 is coaxially aligned with the upper grinding section 2 such that turning the cap 1 turns the upper grinding section 2. In some embodiments the upper grinding section 2 is attached to the cap 1 through a central bore 21. The upper grinding section 2 and a lower grinding section 3 are coaxially disposed and mated together. In some embodiments the upper grinding section 2 includes an extended protrusion 22 coaxial with the central bore 21 which protrusion may include a light or a magnifying light and may function as a cleaning tool.

The upper grinding section 2 and the lower grinding portion 3 each include a plurality of upright blades. FIG. 2A shows the underside of the upper grinding section 2 with blades 2a. In some embodiments, the blades are respectively arranged in a circular shape such that the blades of the upper grinding section 2 are inserted and received between the blades of the lower grinding section 3 when the two grinding sections are mated together. In some embodiments, when mated as such, the blades are relatively close to each other such that when the unit is rotated the target material is effectively cut and ground by the blades. The bottom of the lower grinding section 3 is provided with holes 31 which are in flow communication with the collection section 4 below it. As shown in FIG. 2, in some configurations the lower grinding section 3 is flanged in order to mate with the structure below, namely the collection section 4.

Collection section 4 comprises a housing having a mesh screen 5 forming its bottom partition. A secondary collection section 4A is disposed beneath the screen 5. The collection section 4 is configured to collect falling grounds passing through the lower grinding section 3. The screen 5 functions in some embodiments to filter and collect larger grounds while smaller grounds such as pollen, crystals, and other particulate will pass through the screen 5 and into the secondary collection section 4a. In some embodiments, the screen 5 comprises an electronic scale 51 such a strain-gauge scale that can weigh the contents inside the collection section 4. The scale 51 is in electrical communication with one or more of the components of the electrical housing 6 described below such that the weight can be measured, displayed, and otherwise outputted by the system. In some embodiments the secondary collection section 4a is threadingly or magnetically engaged with the bottom of the collection section 4 as may be the other components.

In use, the user places material to be ground between the grinding section 2 and 3 and then closes the grinder. The magnetic connections assist in aligning and keeping the grinder closed during operation. The user then applies manual force to the cap 1, which rotates the upper grinding section 2. The material is cut and ground by the interaction of the blades ground material falls through the holes 31 of the lower grinding section 3 into the collection section 4. The collection section 4 can then be removed from the grinding lower section 3 such that the user can collect the ground material therein. Likewise the user can access the secondary collection 4A to access smaller particulate.

Beneath the collection section 4 is an electronics housing 6 which houses various electrical components of the container. In some embodiments, the housing 6 includes a power source 61, such as a battery or external power supply, a microcontroller 62, a communications device 63, and a display 64 (See FIG. 2B). The microcontroller 62 provides power and communication connectivity for the various system components including the communications device 63 and display 64. In some embodiments the microcontroller 62 comprises a processor (CPU), memory, and control programming for the various input and output peripherals. The communications device 63 may comprise a Wifi chip, a Bluetooth chip, a NFC chip, a Universal Serial Bus (USB) port, or combinations thereof. In some embodiments the communication device 63 is configured to communicate with an external computing device such as a computer or smartphone in order to send and receive data including status information and commands. Such data transmission can be accomplished through a customized application running on the smartphone or computer. The display may comprise an LED, LCD, OLED, or like display that can be used to output various information including contents weight, battery status, communications status, and the like. The electronics housing 6 is closed at the bottom by partition 6a (See FIG. 2B). The button 7 is used an onboard control interface and may be multi-function and programmed to operate different functions based on the number and duration of presses. In some embodiments the button 7 is a multi-touch touch screen for added functionality.

The storage container section 8 is disposed beneath the electronic housing 6 and provides a space to store unground material or other items. The materials selected for the container of the present invention are not particularly limiting however in some embodiments at least a portion of the upper and lower grinding sections 2 and 3 and/or the container section 8 is comprised of a transparent material so that the user can easily observe the contents therein. The container holder 9 removably receives the container section 8 and provides structure to retain the container section 8. In some embodiments, the container section 8 is retained at the top by the bottom 6a of the electronics housing 6 and at the bottom by the container holder 9. In some embodiments, at least a portion of the electronics housing 6 is connected to the container holder 9 such that the container section 8 can be removed without resulting in the device collapsing or without the need to dissemble the entire unit.

In some embodiments the container holder 9 includes an electronic scale 91, also in some embodiments a strain-gauge type scale that can be used to weigh the contents of the storage container. The scale 91 is in communication with at least a portion of the components of the electronic housing 6 such that the weight can be measured, displayed, and otherwise outputted by the system. In some embodiments the container holder 9 is attached to a base 10 which forms the bottom of the container and in some embodiments includes one or more feet 101 for stability. In some embodiments there is a small storage area 102 between the bottom of the container holder 9 and the base 10 for storage small miscellaneous items. In some embodiments, a foldable-type cleaning tool is provided with the container and is storable in the base 10.

As noted above, the container includes connectivity features such that the communications device can communicate with an outboard smartphone or computer for added functionality. In some embodiments the container is "app-enabled" and works in conjunction with control and notification software. The user can utilize an application running on a smartphone or computer to obtain information from the container such as weight, battery status, or the like. In some embodiments, each time the container is turned on either or both of the scales obtains a weight measurements and stores corresponding weight data in the memory of the microcontroller. Then, each time of the user loads the application on his computing device, the stored weight information is automatically synchronized to the application. The container can also be configured to send outbound alerts to advise the user that, for example, the weight of product in the container section 8 has dropped below a predetermined level. The application may also include functionality to permit the user to directly purchase new products to be used in conjunction with the container.

It is appreciated and understood that the present invention provides an easy to use, feature-rich storage container for the storage, grinding, and management of herb such as tobacco, hemp, Chinese herbal medicine, spices etc. for smoking or other uses. Convenience features such as the integrated scales, display, onboard communications, transparent container, and various storage areas provide an "all-in-one" solution that addresses many wants and desires in the art.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A container, comprising:
   an upper grinding section, a lower grinding section, a collection section, an electronics housing, a storage container section, and a container holder;
   the upper and lower grinding sections are mated together and are configured to grind and pulverize a target material;
   the collection section is disposed beneath the lower grinding section and collects material falling through holes in the lower grinding section;
   the electronics housing includes a display, microcontroller, and a power source; and
   the storage container section is disposed beneath the electronics housing and is retained by the container holder.

2. The container of claim 1, wherein a cap is attached to the upper grinding section to facilitate rotation of the upper grinding section with respect to the lower grinding section.

3. The container of claim 1, wherein each of the upper grinding section and lower grinding section includes a plurality of blades arranged in a circular shape such that the blades of the upper grinding section are inserted and received between the blades of the lower grinding section when the two grinding sections are mated together.

4. The container of claim 1, wherein the collection section comprises a housing having a mesh screen forming a bottom partition.

5. The container of claim 4, wherein a secondary collection section is disposed beneath the screen and is configured to collect particulate falling through the mesh screen.

6. The container of claim 4, wherein the mesh screen comprises an electronic scale to measure a weight of contents in the collection section.

7. The container of claim 6, wherein the electronic scale is in communication with the microcontroller and the display to measure the weight.

8. The container of claim 1, wherein at least two of the upper grinding section, the lower grinding section, the collection section, the electronics housing, the storage container section, and the container holder are removably attached to each other by a magnetic connection.

9. The container of claim 1, wherein at least two of the upper grinding section, the lower grinding section, the collection section, the electronics housing, the storage container section, and the container holder are removably attached to each other by a threaded connection.

10. The container of claim 1, wherein the electronics housing includes a communications device connected to the microcontroller, the communications device operable to send and receive data to and from an external computing device.

11. The container of claim 1, wherein the container holder includes an electronic scale to measure a weight of contents in the container section.

12. The container of claim 11, wherein the electronic scale is in communication with the microcontroller and the display to measure and output the weight.

13. The container of claim 1 further includes a magnifying light disposed in the upper grinding section.

14. The container of claim 1, wherein the container section, upper grinding section, and lower grinding section are each at least partially transparent.

15. The container of claim 1, wherein a base is disposed beneath the container holder wherein a storage area is disposed beneath a bottom of the container holder and the base.

16. A container, comprising:
   a cap, an upper grinding section, a lower grinding section, a collection section, an electronics housing, a storage container section, a container holder, and a base each substantially coaxially aligned with one another;
   the upper and lower grinding sections are mated together and are configured to grind and pulverize a target material;
   the cap attached to the upper grinding section to facilitate rotation of the upper grinding section with respect to the lower grinding section;
   the collection section is disposed beneath the lower grinding section and collects material falling through holes in the lower grinding section;
   the collection section including a housing having a mesh screen forming a bottom partition;
   a secondary collection section disposed beneath the screen and configured to collect particulate falling through the mesh screen;
   the electronics housing includes a display, microcontroller, a power source, and a communications device, the communications device connected to the microcontroller and operable to send and receive data to and from an external computing device; and
   the storage container section is disposed beneath the electronics housing and is retained by the container holder, wherein the container holder comprises an electronic scale to measure a weight of contents in the storage container, the electronic scale in communication with the microcontroller and the display to measure and out the weight.

17. The container of claim 16, wherein at least two of the upper grinding section, the lower grinding section, the collection section, the electronics housing, the storage container section, and the container holder are removably attached to each other by a magnetic connection.

18. The container of claim 16, wherein at least two of the upper grinding section, the lower grinding section, the collection section, the electronics housing, the storage container section, and the container holder are removably attached to each other by a threaded connection.

19. The container of claim 16, wherein the communications device interfaces with an application running on the external computing device, wherein the application is operable to send and receive the data to and from the external device, the data including weight information, battery information, and alerts.

* * * * *